United States Patent [19]

Waggoner et al.

[11] 3,716,394

[45] Feb. 13, 1973

[54] PROCESS OF METAL PLATING HYDROHALOGEN POLYMER SURFACE

[75] Inventors: Terry B. Waggoner, Overland Park, Kans.; Edgar J. Seyb, Jr., Oak Park, Mich.

[73] Assignee: M&T Chemicals Inc., Greenwich, Conn.

[22] Filed: March 9, 1971

[21] Appl. No.: 122,516

Related U.S. Application Data

[63] Continuation-in-part of Ser. No. 574,954, Aug. 25, 1966, Pat. No. 3,639,153.

[52] U.S. Cl. ............117/47 A, 117/71 R, 117/118, 117/130 E, 117/138.8 UF, 117/160 R
[51] Int. Cl. ..........................B23b 15/08, C23c 3/02
[58] Field of Search...117/47 A, 130 E, 160 R, 138.8 UF, 117/118, 71 R

[56] References Cited

UNITED STATES PATENTS

| | | | |
|---|---|---|---|
| 3,067,078 | 12/1962 | Gluck | 117/47 A |
| 3,142,581 | 7/1964 | Leland | 117/47 A |
| 3,370,974 | 2/1968 | Hepfer | 117/47 A |
| 3,392,035 | 7/1968 | Torigai et al. | 117/160 R |
| 3,167,491 | 1/1965 | Harrison et al. | 117/47 R |
| 2,943,937 | 7/1960 | Nadeau et al. | 117/47 A |

*Primary Examiner*—William D. Martin
*Assistant Examiner*—William R. Trenor
*Attorney*—Kenneth G. Wheeless, Robert P. Grindle and Robert P. Auber

[57] ABSTRACT

This invention relates to a method of modifying a hydrohalogen polymer surface wherein said hydrohalogen polymer is selected from the group consisting of polyvinyl chloride, polyvinylidene chloride, and polyvinyl dichloride which comprises contacting the hydrohalogen polymer surface with an alkali metal alkoxide MOR wherein M is an alkali metal and R is an alkyl group at a temperature of 2° to 106° C for a time increment of 5 minutes to 300 minutes thereby forming an alkoxide-activated surface thereof; contacting said surface with an oxygen-containing oxidizing agent of sufficient strength to convert an olefinic double bond to the corresponding aldehyde or carboxyl group to form an oxygen-activated, alkoxide-activated surface; and electrolessly depositing onto said surface a metal deposit.

1 Claim, No Drawings

PROCESS OF METAL PLATING HYDROHALOGEN POLYMER SURFACE

This application is a continuation-in-part of U.S. Pat. application Ser. No. 574,954 filed on Aug. 25, 1966, now U.S. Pat. No. 3,639,153.

This invention relates to the modification of plastic surfaces. More particularly, it relates to the modification of the surface of a hydrohalogen-containing polymer to render it receptive to a deposited metal plate.

It is known that various non-metallic articles may be plated with suitable metals. It has been particularly difficult, however, to obtain satisfactory plated metal surfaces on many plastics, particularly hydrohalogen polymers such as polyvinyl chloride because of the tendency of the plated metal to peel, blister, or otherwise separate from the plastic polymer substrate. Better adhesion between a chemically deposited metal plate and a plastic surface may be obtained by roughening the surface of the plastic prior to deposition of the metal. However, this method of increasing adhesion has inherent deficiencies because the chemically deposited metal plate conforms to the surface characteristics of the plastic substrate and duplicates the same surface defects. A roughened plastic surface may yield a better metal-plastic bond, but the plated surface may have an unsatisfactory dull or coarse appearance corresponding to the finish of the roughened plastic surface.

It is an object of this invention to provide a method of modifying a plastic surface of hydrohalogen polymer prior to plating the plastic material so as to render the surface more adaptable for metal plating. A further object of the invention is to provide hydrohalogen polymeric materials having a coherent metal plated surface. Other objects will be apparent to those skilled in the art from the following description.

This invention is a method of modifying a hydrohalogen polymer surface wherein said hydrohalogen polymer is selected from the group consisting of polyvinyl chloride, polyvinylidene chloride, and polyvinyl dichloride which comprises contacting the hydrohalogen polymer surface with an alkali metal alkoxide MOR wherein M is an alkali metal and R is an alkyl group at a temperature of 2° to 106° C for a time increment of 5 minutes to 300 minutes thereby forming an alkoxide-activated surface thereof; contacting said surface with an oxygen-containing oxidizing agent of sufficient strength to convert an olefinic double bond to the corresponding aldehyde or carboxyl group to form an oxygen-activated, alkoxide-activated surface; and electrolessly depositing onto said surface a metal deposit.

The hydrohalogen polymer surfaces treated in the practice of this invention are those polymers, exhibiting, at least one

group. In this group X is a halogen atom selected from the group consisting of fluorine, chlorine, bromine, and iodine. Preferably, X is an active halogen atom selected from the group consisting of chlorine and bromine. Preferably X is chlorine.

The hydrohalogen polymer surfaces are preferably chlorine-containing polymers and preferably polymers of vinyl chloride or vinylidene chloride. They may be homopolymers of polyvinyl chloride, of polyvinylidene chloride, or of polyvinyl dichloride. They may be copolymers of these compositions with other ethylenically unsaturated monomers. Ethylenically unsaturated monomers are compounds which contain polymerizable carbon-to-carbon double bonds and may include acrylates such as acrylic acid, ethyl acrylate, acrylonitrile, etc.; vinyls such as styrenes, vinyl acetate, etc.; maleates such as maleic acid, maleic anhydride, maleate esters, etc.

The preferred hydrohalogen-containing polymer is polyvinyl chloride.

The polymer may be treated in practice of this invention in the form of bodies, sheets, rods, etc. of polymer. It may also be possible to treat surface layers of polymer on other basis materials, e.g., a body of methyl methacrylate bearing a surface layer of polyvinyl chloride, etc.

Thus, according to the invention, a hydrohalogen polymer such as e.g., a polyvinyl chloride, polyvinylidene chloride, polyvinyl dichloride, polychlorostyrene, etc., may be contacted with an alkali metal alkoxide to give an alkoxide-activated surface. The alkali metal alkoxides which are employed are those having the formula MOR wherein M is an alkali metal and R is an alkyl group. M may be potassium, sodium, lithium, and preferably sodium. R may be methyl, ethyl, n-propyl, i-propyl, n-butyl, i-butyl, s-butyl, n-amyl, n-hexyl, i-hexyl, n-heptyl, n-octyl, 2-ethyl hexyl, nonyls, decyls, dodecyls, etc. In the preferred embodiment R may be an alkyl group having one to 12 carbon atoms and most preferably one to eight carbon atoms.

Typical illustrative alkoxides MOR which may be employed may include:
lithium methoxide
lithium ethoxide
lithium n-propoxide
lithium i-propoxide
lithium 2-ethyl hexoxide
sodium methoxide
sodium ethoxide
sodium n-propoxide
sodium i-propoxide
sodium n-butoxide
sodium 2-ethyl hexoxide
sodium dodecoxide
potassium methoxide
potassium ethoxide
potassium n-propoxide
potassium i-propoxide The preferred alkoxide may include the ethoxides and propoxides and preferably sodium ethoxide and sodium i-propoxide.

The alkoxides may be dissolved in alcohol ROH and preferably the corresponding alcohol. Preferably sodium ethoxide may be made by adding sodium metal to an excess of absolute ethanol and the resulting solution used as prepared—containing an excess of ethanol in which the solid sodium ethoxide is very soluble.

Contact between the hydrohalogen polymer surface and the alkoxide may be effected preferably by dipping the polymer surface into a body of the alkoxide in solution. Temperature during contact is 2° – 106° C, preferably 55° – 88° C, more preferably 60° – 77° C. Contact time is 5 minutes to 300 minutes, most preferably 10 – 45 minutes. Illustrative temperatures and times may be as set forth in Table I.

TABLE I

| Alkali Metal Alkoxide | Solvent | Time (minutes) | Temperature (°C) |
| --- | --- | --- | --- |
| Sodium isopropoxide | isopropyl alcohol | 5–20 | 15–100 |
| Sodium 2-ethylhexoxide | 2-ethylhexanol | 20–30 | 15–106 |
| Potassium tert.-butoxide | tert.-butyl alcohol | 10–20 | 69–106 |
| Potassium isopropoxide | isopropyl alcohol | 5–20 | 83–106 |

Temperatures up to the boiling point of the solution may be used.

During contact between the surface and the alkoxide, the surface becomes activated. In some cases there may be no apparent visual change in the surface although in other cases, the surface may visually appear slightly modified. The treated surface is referred to as an alkoxide-activated surface.

It is a particular feature of this invention that the novel product so prepared may comprise a basis material bearing a hydrohalogen surface including at least one — CH — CX — group, wherein X is a halogen, at least a portion of which has been alkoxide-activated. This novel product is characterized by the presence on the polymer surface of double bonds formed by the splitting out of hydrohalogen acid HX to form a polymer surface including at least one — C = C — group.

This novel product is particularly characterized by its chemical reactivity, and particularly by its ready ability to be oxidized, to accept donor atoms from other molecules, etc.

The alkoxide-activated surface of the hydrohalogen polymer material is contacted with an oxidizing agent of sufficient strength to convert an olefinic double bond to the corresponding aldehyde, ketone, or carboxyl group. Typical oxidizing agents include oxygen, potassium permanganate (in aqueous solution) $KMnO_4$, chromic acid (in aqueous solution), organic peracids (such as perbenzoic acid, peracetic acid, etc.), inorganic peroxides (such as hydrogen peroxide), etc. Oxidation is carried out at temperatures from ambient room temperature (typically 15° – 20° C) to the melting point of the plastic. Preferably, temperatures of from about 55° – 77° C are employed. The alkoxide-activated surface is generally contacted with the oxidizing agent at temperatures of from about 66° – 77° C, for time intervals of 2–3 seconds to 2–3 hours. Longer contact times may be employed if desired on certain hydrohalogen polymers [e.g., poly(vinylidene chloride)], but it is preferable to use contact times of only a few minutes, especially with hydrohalogen resins such as polyvinyl chloride.

It is a particular feature of this invention that the product so-prepared comprises a basis material bearing a hydrohalogen surface including at least one —CH — CX — group, wherein X is halogen, at least a portion of which has been alkoxide-activated and then oxygen-activated e.g., oxidized. This novel product is characterized by the presence on the polymer surface of polar (i.e., more strongly polar than before) groups including hydroxyl, aldehyde, ketone, carboxyl, etc.

This novel product is particularly characterized by its chemical reactivity, and particularly by its ready ability to receive a chemically deposited plate metal.

The oxygen-activated polymer surface (obtained by contact with alkali metal alkoxide and subsequent treatment with an oxidizing agent) may be electrolessly plated as by chemical plating. Electroless plating includes maintaining the surface in contact with a medium containing in solution the metal to be electrolessly plated and a reducing agent capable of reducing the metal to be plated to its zero-valent form. Metals which may be chemically or electrolessly deposited on the activated plastic substrate include e.g., nickel, silver, cobalt, copper, gold, etc. Preferably metallic nickel is deposited by chemical reduction on the oxygen-activated polymer surface. In a typical nickel deposition, the oxygen-activated polymer surface is rinsed with water, contacted with aqueous solution of stannous chloride (prepared by combining 50 g/l of $SnCl_2·2H_2O$ and 100 g/l of concentrated hydrochloric acid) at 20° C for about 1 minute. The polymer is then rinsed with water and contacted for one minute with aqueous palladium dichloride $PdCl_2$ (0.2 g/l of $PdCl_2$ and containing 5 g/l of concentrated hydrochloric acid). The polymer surface is again rinsed with water and then immersed for about 5–10 minutes (depending upon the thickness of nickel plate desired) in a chemical plating bath (pH approximately 4.5, temperature about 72° C) containing 50 g/l of $NiCl_2·6H_2O$, 10 g/l of $NaH_2PO_2·H_2O$, and 10 g/l of $Na_3C_6H_5O_7·2H_2O$. The nickel plated polymer surface is then removed from the bath and rinsed.

The plated polymer surface may be subsequently electroplated (e.g., with copper, nickel, chromium, etc.) or may be used directly without further plating.

The following examples (wherein all parts are by weight unless otherwise noted) are submitted for the purpose of illustration only and are not to be construed as limiting the scope of the invention in any way.

EXAMPLE 1

A clean polyvinyl chloride polymer (PVC) panel (10 cm × 10 cm × 3mm) was immersed for twenty minutes at 66° C in 785 parts of isopropyl alcohol containing 35 parts of sodium isopropoxide (prepared by dissolving 10 parts of sodium in 785 parts of isopropyl alcohol). The alkoxide-activated polyvinyl chloride surface was removed, rinsed in cold running water for a few seconds, and then placed in 1,000 parts of a chromic acid-sulfuric acid solution containing 100 g/l of $CrO_3$ and 500 g/l of $H_2SO_4$ at about 66° C for approximately 20 minutes. The surface of the polymer became wetted after being in the oxidizing bath for only about 30 seconds (indicating that the surface had been oxygen-activated upon contact). The polymer was removed, rinsed, immersed in stannous chloride solution (50 g/l of $SnCl_2·2H_2O$ and 100 g/l of concentrated HCl for 1 minute, at room temperature, removed, rinsed in $H_2O$, immersed in palladium dichloride $PdCl_2$ solution (0.2 g/l of $PdCl_2$ and 5 g/l of concentrated hydrochloric acid) at room temperature, removed and placed in a chemical nickel plating bath at 71° C (containing 50 g/l of $NiCl_2 \cdot 6H_2O$, 10 g/l of sodium citrate $\cdot 2H_2O$, and 10 g/l of $NaH_2PO_2 \cdot H_2O$) for about 5 minutes. The nickel-plated polymer was removed, rinsed, and a 0.003 cm. thickness of dull copper electrolytically deposited on the nickel-plated surface. The polymer was then removed from the bath and plated with an additional 0.0075 mm of bright nickel.

The plated panel was subjected to "a standard thermo-cycle" test which comprises heating the plated polymer for 60–70 minutes at 96° C, then at room temperature 27° – 32° C) for about 10 minutes, and then cooling to about −10° C for 60–70 minutes. This cycle, when repeated three times for each plated article, is termed a "standard thermocycle test." No blistering, peeling, or lifting of the metal from the panel was observed after completion of the standard thermo-cycle test.

EXAMPLES 2–21

Table II summarizes the results obtained using the general procedure of Example 1, but with different alkali metal alkoxides and various hydrohalogen polymers.

The following abbreviations are employed in Table II:
PVC = Polyvinylchloride
PVDC = Polyvinyldichloride
S = Polyvinylidenechloride The results of the standard thermo-cycle test were used to measure adhesion-quality and are rated as follows:
Good - No blistering or peeling of metal.
Fair - Some blistering or peeling, but no complete separation of metal.
Poor - Metal coating completely separated from the surface of the plastic over the entire panel.

TABLE II
SUMMARY OF ADHESION RESULTS OBTAINED FROM VARIOUS ALKALI METAL ALKOXIDES

| Example No. | Plastic | Alkali metal alkoxide | Solvent | Adhesion |
|---|---|---|---|---|
| 2 | PVC | None * | None (control) | Poor |
| 3 | PVC | None * | n-$C_{16}H_{13}OH$ | Poor |
| 4 | PVC | n-$C_6H_{13}ONa$ | n-$C_6H_{13}OH$ | Fair |
| 5 | PVC | None * | t-$C_4H_9OH$ | Poor |
| 6 | PVC | t-$C_4H_9OK$ | t-$C_4H_9OH$ | Fair |
| 7 | PVC | None * | $CH_3OH$ | Poor[1] |
| 8 | PVC | $CH_3ONa$ | $CH_3OH$ | Fair |
| 9 | PVC | None * | iso-$C_3H_7OH$ | Poor |
| 10 | PVC | iso-$C_3H_7OK$ | iso-$C_3H_7OH$ | Good |
| 11 | PVC | iso-$C_3H_7ONa$ | iso-$C_3H_7OH$ | Good |
| 12 | PVC | None * | $C_2H_5OH$ | Poor |
| 13 | PVC | $C_2H_5ONa$ | $C_2H_5OH$ | Fair |
| 14 | PVDC | None * | $C_2H_5OH$ | Poor |
| 15 | PVDC | $C_2H_5ONa$ | $C_2H_5OH$ | Good |
| 16 | PVDC | None * | iso-$C_3H_7OH$ | Fair |
| 17 | PVDC | iso-$C_3H_7ona$ | iso-$C_3H_7OH$ | Good |
| 18 | S | $C_2H_5ONa$ | $C_2H_5OH$ | Poor[2] |
| 19 | S | $C_2H_5ONa$ | $C_2H_5OH$ | Good |
| 20 | S | None * | iso-$C_3H_7OH$ | Poor |
| 21 | S | iso-$C_3H_7OK$ | iso-$C_3H_7H$ | Good |

* Control Examples.
[1] No oxidizing agent was used.
[2] No oxidizing agent was used: electroless Ni coating peeled away.

It will be apparent to those skilled in the art that control Examples 2, 3, 5, 7, 9, 12, 14 and 20 did not yield satisfactory results. On the other hand, Examples 4, 6, 8, 10, 11, 13, 15, 17, 18, 19 and 21 permitted attainment of satisfactory results. By comparison, for example, of Examples 9 and 10, it will be apparent that practice of this invention attains outstanding results where no satisfactory results are otherwise attained by other techniques. Further improvements are shown by comparing Examples 16 and 17.

EXAMPLES 22–27

In the following examples, isopropyl alcohol was employed as the solvent. The force required to separate metal from the polymer surface was determined as follows: Each plated polymer panel (10cm × 10 cm × 3 mm) was cut in order to obtain a portion about 2.5 cm wide and 8–9 cm long. The metal coating was peeled back at one end by hand until a sufficient grip on the metal could be obtained. The panel was mounted on a fixed holder and fastened to a rod with a clamp. The clamp was connected to a strain gage. A force was applied and the plate was slowly pulled from the polymer surface at a rate of 1.8 cm/minute. The separation force required to pull the metal away from the polymer surface at this uniform rate was determined from the strain gage. Separation force was expressed in kilograms per centimeter of width and the maxium value was recorded. To give a comparison with results obtained by the thermo-cycle test, values of about 0.13 to 0.27 are Fair, values above 0.27 are Good, and values below 0.13 are Poor.

The results are summarized in TAble III.

TABLE III

| Example No. | Polymer | Alkali metal alkoxide | Adhesion (as measured by thermo-cycle) | Separation force (kg/cm) |
|---|---|---|---|---|
| 22 | PVC | None (control) | Poor | — |
| 23 | PVC | i-$C_3H_7ONa$ | Good | 0.32 |
| 24 | PVDC | None (control) | Fair | 0.18 |
| 25 | PVDC | i-$C_3H_7ONa$ | Good | 0.36 |
| 26 | S | None (control) | Poor | — |
| 27 | S | i-$C_3H_7ONa$ | Good | 0.71 |

From Table III it can be readily seen that the polymers of Examples 23, 25, and 27 had significantly better adhesion properties after treatment with alkali metal alkoxide when compared with the polymers of corresponding Examples 22, 24, and 26 which were not alkoxide-activated. In Examples 22 and 26 the nickel plate separated completely during the thermo-cycle test.

Although this invention has been described by reference to preferred illustrative examples, it will be apparent to those skilled in the art that various modifications and changes may be made thereto which fall within the scope of this invention.

We claim:
1. The method of plating an article having a hydrohalocarbon polymer surface which comprises:
   a. contacting the article with an alkali metal alkoxide MOR wherein M is an alkali metal and R is an alkyl group having one to 12 carbon atoms forming an alkoxide-activated surface which is readily susceptible to oxidation;
   b. contacting said surface with an oxygen-containing oxidizing agent selected from the group consisting of chromic acid and potassium permanganate forming an oxygen-activated, alkoxide-activated surface;

c. contacting the said surface with stannous chloride in aqueous solution;
d. contacting said surface with palladium dichloride in aqueous solution; and
e. contacting said surface with an aqueous solution containing at least one member selected from the group consisting of nickel chloride and cupric chloride thereby obtaining a chemically plated polymer surface on said article.

* * * * *